United States Patent

Ogawa

(10) Patent No.: US 10,573,345 B2
(45) Date of Patent: Feb. 25, 2020

(54) INFORMATION PROCESSING APPARATUS, CONTROL METHOD THEREOF AND STORAGE MEDIUM

(71) Applicant: CANON KABUSHIKI KAISHA, Tokyo (JP)

(72) Inventor: Tatsuya Ogawa, Tsukuba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/352,545

(22) Filed: Mar. 13, 2019

(65) Prior Publication Data

US 2019/0304505 A1 Oct. 3, 2019

(30) Foreign Application Priority Data

Mar. 27, 2018 (JP) ................................ 2018-059800

(51) Int. Cl.
| | | |
|---|---|---|
| *G11B 17/047* | (2006.01) | |
| *G11B 7/085* | (2006.01) | |
| *G11B 20/18* | (2006.01) | |
| *G11B 19/04* | (2006.01) | |
| *G11B 5/54* | (2006.01) | |
| *G11B 21/12* | (2006.01) | |

(52) U.S. Cl.
CPC ............ *G11B 20/1816* (2013.01); *G11B 5/54* (2013.01); *G11B 19/04* (2013.01); *G11B 21/12* (2013.01)

(58) Field of Classification Search
CPC ..... G11B 17/041; G11B 17/04; G11B 17/047; G11B 7/085; G11B 19/06; G11B 19/10; G11B 17/035; G11B 17/0407; G11B 17/028
USPC ...... 360/75, 99.02, 264.3; 369/30.27, 30.36; 720/601, 602, 606, 619
See application file for complete search history.

(56) References Cited

U.S. PATENT DOCUMENTS 5,210,725 A * 5/1993 Kase .................... G11B 15/675
360/99.06

FOREIGN PATENT DOCUMENTS

JP 2008-140492 6/2008

* cited by examiner

*Primary Examiner* — Nabil Z Hindi
(74) *Attorney, Agent, or Firm* — Venable LLP

(57) ABSTRACT

An object of the preset invention is to prolong the life of an HDD by performing load/unload control without reducing usability. The present invention is an information processing apparatus including: a hard disk drive; a control unit configured to perform control so that a load state in the hard disk drive is kept for a predetermined time; and a derivation unit configured to derive the number of times of load/unload in the hard disk drive, and the information processing apparatus further includes a change unit configured to change the predetermined time during which the load state is kept based on the operation time of the information processing apparatus and the number of times of load/unload.

9 Claims, 7 Drawing Sheets

INFORMATION PROCESSING APPARATUS, CONTROL METHOD THEREOF AND STORAGE MEDIUM

BACKGROUND OF THE INVENTION

Field of the Invention

The present invention relates to a technique of load/unload control in an image forming apparatus that mounts a hard disk drive (herein, HDD).

Description of the Related Art

Conventionally, a large-capacity storage device, such as an HDD, is mounted within an image forming apparatus and a storage function to save, edit, and so on image data as well as storing operation programs is implemented. Further, in order to implement a high-level function of an image forming apparatus, an application program for each of various functions is installed.

The HDD includes a disk, which is a magnetic storage medium, and a head that performs read/write of data. By the head accessing the disk rotating at a high speed while moving through a gap (this is called load), it is possible to perform read/write of data at a high speed and randomly. In a common HDD, after a load, the head is evacuated from above the disk and moved to a predetermined position (home position) (this is called unload). The reason is that in a case where the power source is turned off or an impact is applied while the head is accessing the disk, there is a possibility that the head or the disk is damaged, and therefore, it is necessary to cancel the load state after a job is completed.

Incidentally, the life of an HDD is specified individually. This life also includes the number of times of load/unload cycle (hereinafter, referred to as the number of times of load/unload) of the head described above, in addition to the number of times the power source is turned on/off and the drive time of a spindle motor. Consequently, in order to use the HDD until the end of the life of the HDD, which is specified by the specifications, it is requested to suppress the speed of an increase in the number of times of load/unload by appropriately controlling load/unload. For example, Japanese Patent Laid-Open No. 2008-140492 has disclosed that the power-saving transition time is adjusted based on whether the number of times of load/unload exceeds a threshold value. In a case where the time measured by a timer exceeds the power-saving transition time, the power mode is caused to make a transition into the energy-saving mode.

SUMMARY OF THE INVENTION

However, Japanese Patent Laid-Open No. 2008-140492 has such a problem that usability is reduced because the transition time into the energy-saving mode becomes short in a case where the number of times of load/unload exceeds a predetermined number of times. Consequently, in view of the above-described problem, an object of the present invention is to prolong the life of an HDD by performing load/unload control without reducing the usability.

The present invention is an information processing apparatus including: a hard disk drive; a control unit configured to perform control so that a load state in the hard disk drive is kept for a predetermined time; and a derivation unit configured to derive the number of times of load/unload in the hard disk drive, and the information processing apparatus further includes a change unit configured to change the predetermined time during which the load state is kept based on the operation time of the information processing apparatus and the number of times of load/unload.

Further features of the present invention will become apparent from the following description of exemplary embodiments with reference to the attached drawings.

DESCRIPTION OF THE EMBODIMENTS

First Embodiment

In the following, the information processing apparatus in the present embodiment is explained by using the drawings with an image forming apparatus being taken as an example. However, the following embodiments are not intended to limit the present invention only to those and all combinations of features described in the following embodiments are not necessarily indispensable to the solution of the present invention. Explanation is given by attaching the same symbol to the same configuration.

<About Configuration of Controller Unit>

Figure 1:
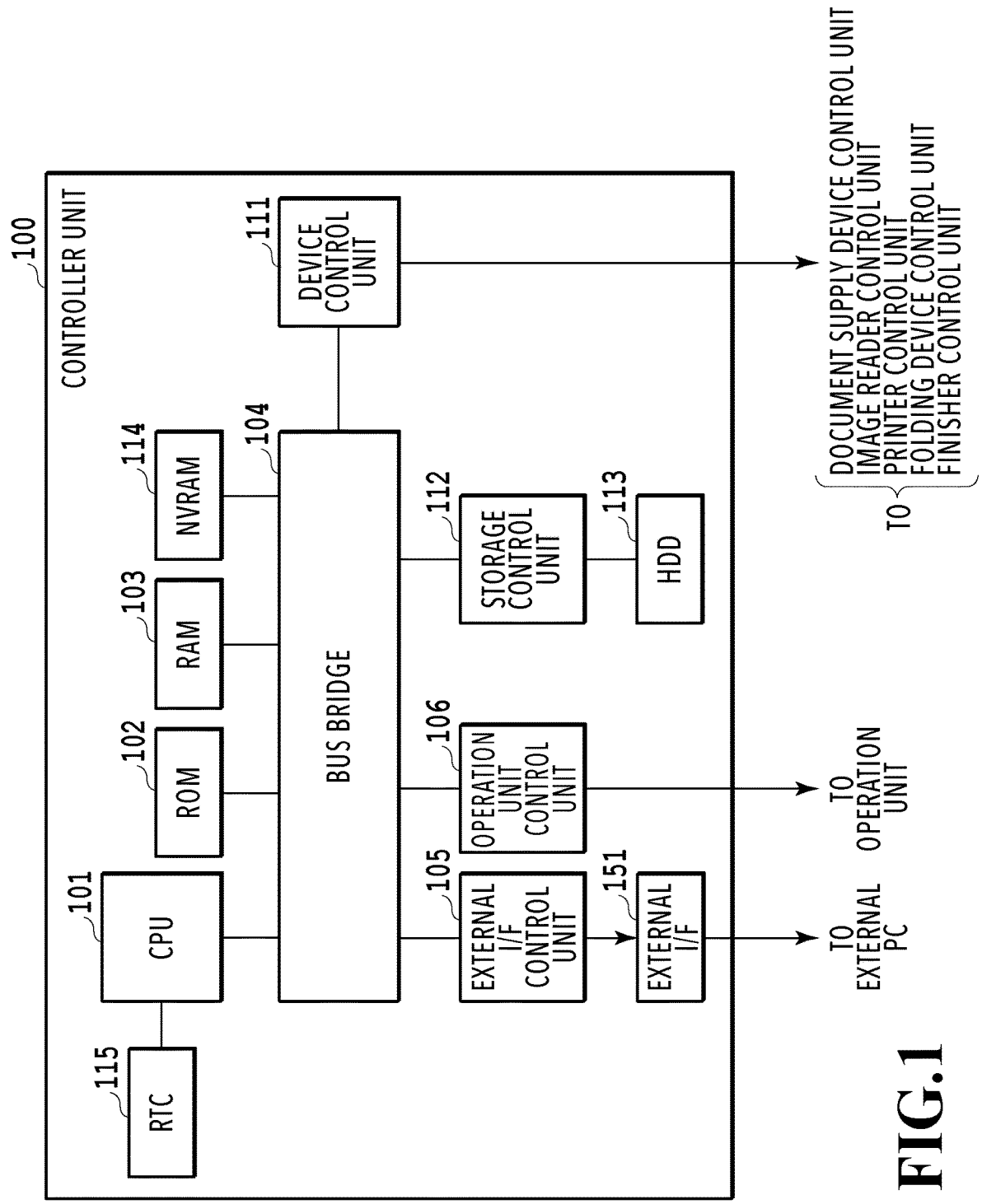
FIG. 1 is a block diagram showing a configuration of a controller unit in a first embodiment.

FIG. 1 is a block diagram showing a configuration of a controller unit 100 possessed by an image forming apparatus in the present embodiment.

The controller unit 100 acquires image data of a document, which is input by communicating with a document conveyance device control unit configured to control a document conveyance device and an image reader control unit configured to control an image reader based on instructions sent from an operation unit or an external computer (external PC), not shown schematically. Further, the controller unit 100 forms an image on a printing medium, such as a sheet, based on image data by communicating with a printer control unit configured to control a printer unit. Furthermore, the controller unit 100 implements a desired output, such as a staple and a punch hole, for a sheet on which an image is formed by communicating with a folding device control unit configured to control a folding device and a finisher control unit configured to control a finisher.

An external interface (external I/F) 151 is an interface that connects with the external PC. For example, the external I/F 151 develops print data received from the external PC connected via an external bus, such as a network and USB, into image data and outputs the image data, transmits image data within an HDD 113, to be described later, to the external PC, and so on.

The controller unit 100 has a CPU 101 and the CPU 101 is controlled based on an operating system (hereinafter, OS).

The CPU 101 is connected with a bus bridge 104 and reads an initial activation program of the CPU 101 from a ROM 102 via the bus bridge 104. Further, to the bus bridge 104, a RAM 103 that is used as a work area of an arithmetic operation accompanying control, a storage control unit 112 configured to control a storage device, and an NVRAM 114 that stores information relating to a time during which the load state is kept (referred to as load keeping time) are also connected. Consequently, it is possible for the CPU 101 to perform transmission or reception of data with the RAM 103, the storage control unit 112, and the NVRAM 114 via the bus bridge 104. The load state, which is one of the states in the HDD 113, will be described later by using FIG. 2.

In the ROM 102, a time table used for managing the load state of the HDD 113 is stored and in a case where a re-setting condition of the load keeping time is satisfied, the CPU 101 refers to the time table. Then, the CPU 101 selects one of values of the load keeping time held in this time table and stores the selected value in the NVRAM 114. The CPU 101 controls the HDD 113 so as to keep the load state via the storage control unit 112 by using the value of the load keeping time stored in the NVRAM 114.

In the HDD 113, main programs including the OS of the CPU 101 are stored and in addition thereto, image data is stored. This image data is, for example, image data acquired by using an image reader or acquired from an external PC via an external I/F, or image data edited by a user via an operation unit, or the like. Further, in the HDD 113, application programs, preference data, and so on are also stored. The preference data includes information (so-called setting information) relating to user settings, such as a display of the operation unit and a transition time into an energy-saving mode, and registration information, such as an address book. It is possible for the CPU 101 to access the HDD 133 via the bus bridge 104 and the storage control unit 112.

Further, to the bus bridge 104, an external I/F control unit 105 configured to control a network and a USB interface, an operation unit control unit 106 configured to control the operation unit, and a device control unit 111 are connected. The device control unit 111 is connected with a document conveyance device control unit, an image reader control unit, a printer control unit, a folding device control unit, and a finisher control unit, not shown schematically, and governs the control of these units.

It is possible for a real time clock (hereinafter, RTC) 115 to acquire the current time and notifies the CPU 101 of the acquired current time. The CPU 101 stores information on the time at which the image forming apparatus operates for the first time in the NVRAM 114 and derives a time (referred to as an operation time of the image forming apparatus) having elapsed from the time at which the image forming apparatus operates for the first time based on the time at which the image forming apparatus operates for the first time and the current time notified by the RTC 115.

<About Configuration of HDD>

Figure 2:
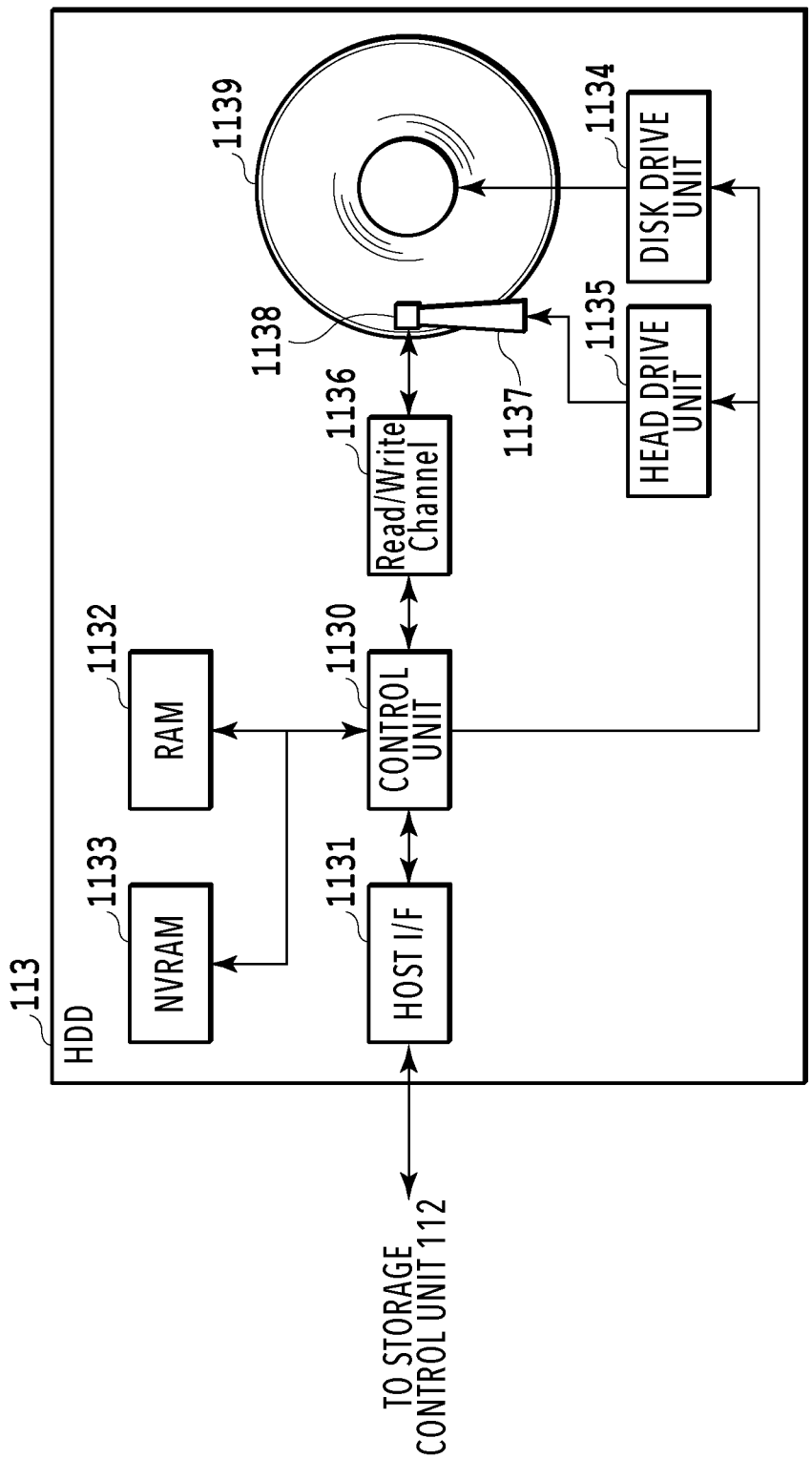
FIG. 2 is a diagram showing a configuration of a hard disk drive.

FIG. 2 is a diagram showing an internal configuration of the hard disk drive. The HDD 113 includes a control unit 1130, a host I/F 1131, a RAM 1132, an NVRAM 1133, a disk drive unit 1134, a head drive unit 1135, a read/write signal processing unit 1136, an arm 1137, a magnetic head 1138, and a magnetic disk 1139. The host I/F 1131 is a module for communicating with the storage control unit 112. In this example, it is assumed that the serial ATA (Serial AT Attachment: hereinafter SATA) interface is used as the host I/F 1131.

The HDD 113 receives a SATA command from the storage control unit 112. Based on the SATA command received by the HDD 113, processing to access a specific sector of the magnetic disc 1139, to read data, to write data, to delete data, or the like is performed. At this time, the control unit 1130 performs processing to cause the head drive unit 1135 to operate to move the magnetic head 1138 from the home position located outside the magnetic disk 1139 to above the magnetic disk 1139, that is, so-called load processing. The state where the magnetic head 1138 is located above the magnetic disk 1139 is referred to as a load state.

The control unit 1130 receives information relating to the load keeping time from the storage control unit 112 via the host I/F 1131. In a case where the load keeping time has elapsed after the job accompanied by the processing to read, write, or delete data for the magnetic disk 1139 is competed, the control unit 1130 performs processing to move the magnetic head 1138 to the outside (home position) of the magnetic disk 1139. The series of processing is referred to as unload processing and the state where the magnetic head 1138 is located at the home position is referred to as an unload state.

In a case where the state makes a transition into the unload state, the control unit 1130 updates S. M. A. R. T. information stored in the NVRAM 1133, specifically, increments the value of the number of times of load/unload held within the S. M. A. R. T. information. Further, the control unit 1130 transmits the updated S. M. A. R. T. information to the storage control unit 112.

<About Adjustment of Load Keeping Time>

Figure 3:
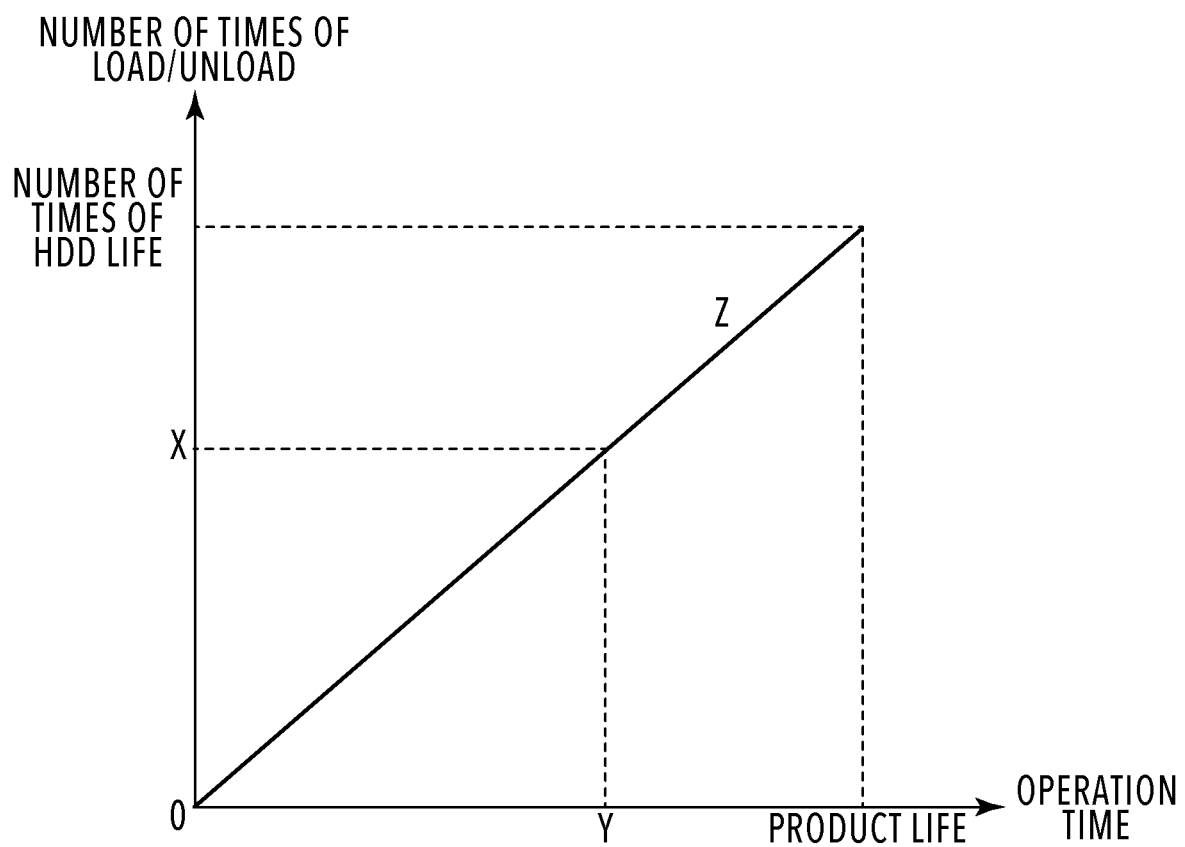
FIG. 3 is a diagram explaining adjustment of a load keeping time.

FIG. 3 shows a graph example used at the time of adjustment as a diagram explaining adjustment of the load keeping time. In this graph, the horizontal axis represents the operation time of the image forming apparatus and the vertical axis represents the number of times of load/unload of the HDD. From a point specified by the upper limit of the operation time of the image forming apparatus (that is, the product life) and the number of times of load/unload corresponding to the product life (referred to as the number of times of HDD life), a linear line (referred to as a transition line Z) is drawn toward the origin. The transition line Z is used as a determination criterion of whether it is possible to use the image forming apparatus until the end of the product life. In the present embodiment, at the time of the number of times of load/unload reaching a predetermined number of times and determining whether to adjust the load keeping time, the time on the transition line Z corresponding to the number of times of load/unload at the point in time is set as a threshold value. Then, based on a relationship between the operation time held by the image forming apparatus and the set threshold value, the load keeping time is adjusted in accordance with the necessity.

As an example, a case is considered where the operation time corresponding to the number of times of load/unload of the image forming apparatus being X (corresponding threshold time on the transition line Z is Y time) is shorter than Y time. That the operation time at the time of the number of times of load/unload reaching X is shorter than the Y time means that the frequency of load/unload is higher than supposed one and the speed of an increase in the number of times of load/unload is higher than supposed one. Consequently, in a case where the image forming apparatus is kept being used in the conventional use state, there is a possibility that it is not possible to use the product until the end of the product life. Because of this, the CPU 101 performs control so as to prolong the load keeping time.

In contrast to this, in a case where the elapsed time at the time of the number of times of load/unload reaching X is longer than the Y time, the CPU 101 determines that it is possible to use the product until the end of the product life even in a case where the image forming apparatus is used continuously in the conventional use state and performs control so that the current setting of the load keeping time is kept as it is. In this case, it may also be possible to perform control so as to shorten the load keeping time.

<About Load/Unload Control Processing>

In the following, load/unload control processing in the present embodiment is explained by using FIG. 4.

Figure 4:
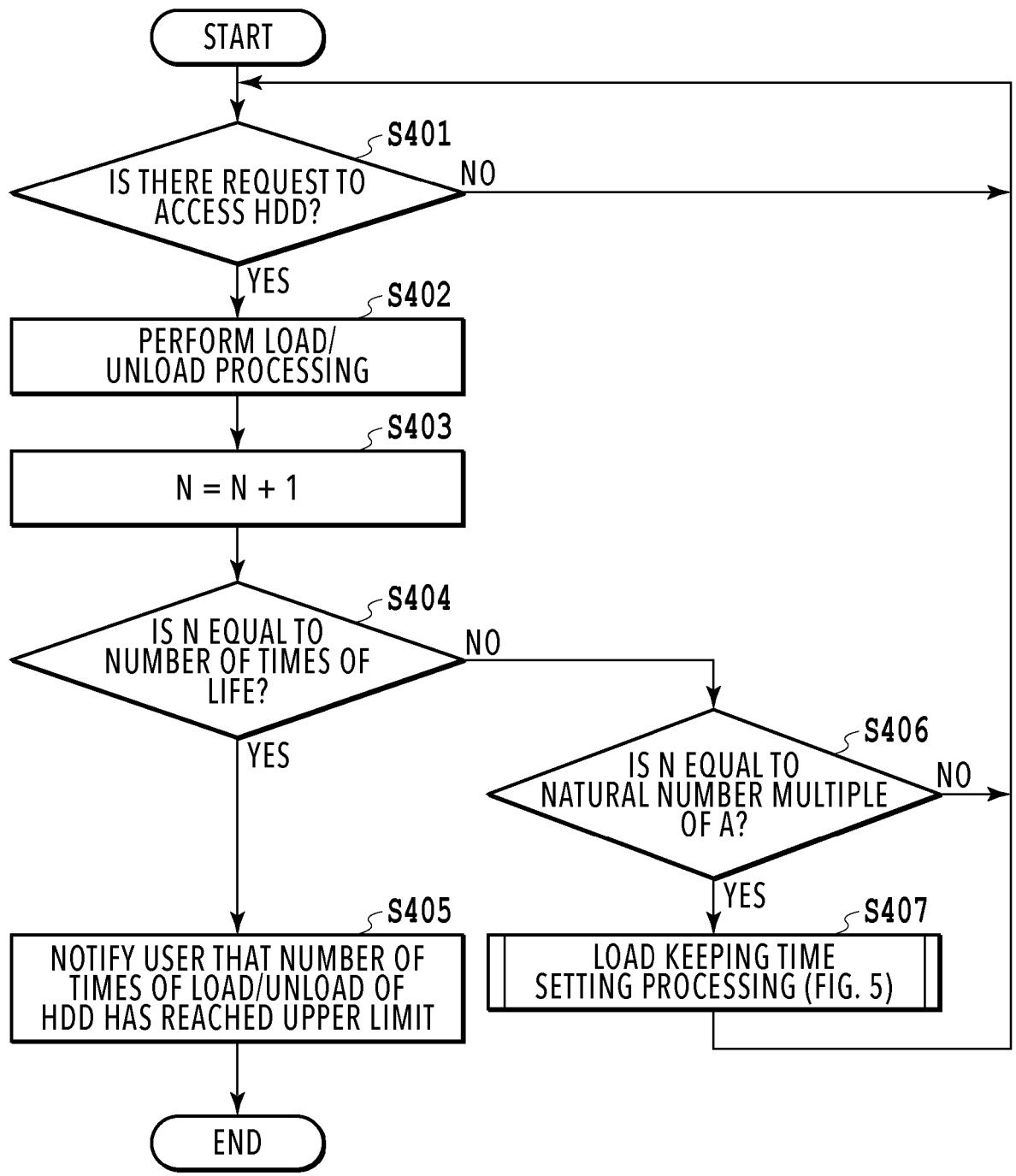
FIG. 4 is a flowchart of load/unload control processing in the first embodiment.

The processing in FIG. 4 starts in response to the power source of the image forming apparatus being turned on. At step S401, the CPU 101 determines whether there is a request to access the HDD 113. In the following, "step S" is abbreviated simply to "S". In a case where the determination results at S401 are affirmative, the processing advances to S402. On the other hand, in a case where the determination results are negative, the CPU 101 waits until a request to access the HDD 113 is received.

At S402, the CPU 101 performs the load/unload processing in the HDD 113. In detail, first, the control unit 1130 brings the HDD 113 into the load state in accordance with instructions from the storage control unit 112. That is, the control unit 1130 moves the magnetic head 1138 to above the magnetic disk 1139 that rotates at a high speed by causing the disk drive unit 1134 and the head drive unit 1135 to operate and generate a drive force. In a case where the HDD 113 enters the load state, the job processing accompanied by processing to read data from the magnetic disk 1139, to write data to the magnetic disk 1139, to delete data, or the like is performed. After the completion of the job processing, the control unit 1130 determines whether to start the unload processing by using load keeping time information stored in the NVRAM 114. That is, in a case where a predetermined load keeping time has elapsed after the completion of the job processing, the control unit 1130 causes the head drive unit 1135 to operate and generate a drive force in the direction opposite to that at the time of load. Due to this, the magnetic head 1138 is evacuated from above the magnetic disk 1139 and moved up to the home position finally.

At S403, the control unit 1130 increments the value of the parameter (referred to as N) for counting the number of times of load/unload and updates the value of N held within the S. M. A. R. T information stored in the NVRAM 1133. Further, the control unit 1130 transmits the S. M. A. R. T information whose number N of times of load/unload is updated to the CPU 101.

At S404, the CPU 101 functions as a life determination unit, specifically, the CPU 101 determines whether the value of N is equal to a predetermined number of times (that is, number of times of HDD life) indicating the life of the HDD 113 by using the S. M. A. R. T information transmitted from the control unit 1130. In a case where the determination results at S404 are affirmative, the processing advances to S405. On the other hand, in a case where the determination results are negative, the processing advances to S406.

At S405, the CPU 101 notifies a user that the life of the HDD 113 has ended, specifically, that the number of times of load/unload in the HDD 113 has reached the upper limit via the operation unit and prompts a user to exchange the HDD.

At S406, the CPU 101 determines whether the number N of times of load/unload is equal to a natural number multiple of a predetermined number A of times. In a case where the determination results at S406 are affirmative, the processing advances to S407. On the other hand, in a case where the determination results are negative, the processing returns to S401. The predetermined number A of times is one of the factors of the number of times of HDD life. For example, in a case where the number of times of HDD life is 600,000, as the predetermined number A of times, 50,000, 60,000, 100,000, or the like is considered and it may be possible for a designer to select any one value.

At S407, the CPU 101 performs processing to set the load keeping time (referred to as load keeping time setting processing) and after this, the processing returns to S401. The value of the load keeping time derived by the load keeping time setting processing is stored in the NVRAM 114. Details of the load keeping time setting processing in the present embodiment will be described later by using FIG. 5.

As described above, in the present embodiment, each time the load/unload processing is performed the predetermined number of times (in the example described previously, A times), the load keeping time setting processing is performed (YES at S406→S407). The above is the contents of the load/unload control processing in the present embodiment.

<About Load Keeping Time Setting Processing>

In the following, the load keeping time setting processing (S407 in FIG. 4) in the present embodiment is explained by using FIG. 5.

At S501, the CPU 101 determines whether the operation time of the image forming apparatus is longer than the time (referred to as a threshold time) corresponding to the number N of times of load/unload set as a threshold value. In a case where the determination results at this step are affirmative, the processing advances to S502. On the other hand, in a case where the determination results are negative, the processing advances to S504. It is possible to uniquely derive the threshold time that is used at this step by using the graph illustrated in FIG. 3. It may also be possible to derive the threshold time corresponding to the number of times of load/unload by using a table or a mathematical expression in place of the graph.

First, a case is explained where the operation time of the image forming apparatus is longer than the threshold time (in a case of YES at S501). In this case, at S502, the CPU 101 determines whether the value of the load keeping time stored in the NVRAM 114 is the initial value. The initial value of the load keeping time is held within the time table stored in the ROM 102. In a case where the determination results at this step are affirmative, the series of processing is terminated. In this case, the value of the load keeping time is not updated and the current value is kept. On the other hand, in a case where the determination results at this step are negative, the processing advances to S503.

At S503, the CPU 101 refers to the table holding the values of the load keeping time, which is stored in the ROM 102, and selects a value shorter than the current value by one step and stores the selected value in the NVRAM 114 (saves the selected value in an overwriting manner). In the following, an example of the table that is referred to at this step is shown.

TABLE 1

| First step (Initial value) | Second step | Third step | Fourth step | Fifth step |
| --- | --- | --- | --- | --- |
| 15 s | 30 s | 60 s | 90 s | 120 s |

Following the above, a case is explained where the operation time of the image forming apparatus is shorter than or equal to the threshold time (in a case of NO at S501). In this case, at S504, the CPU 101 refers to the table holding the values of the load keeping time, which is stored in the ROM 102, and selects a value longer than the current value by one step and stores the selected value in the NVRAM 114 (saves the selected value in an overwriting manner). The above is the contents of the load keeping time setting processing in the present embodiment.

Second Embodiment

Figure 5:
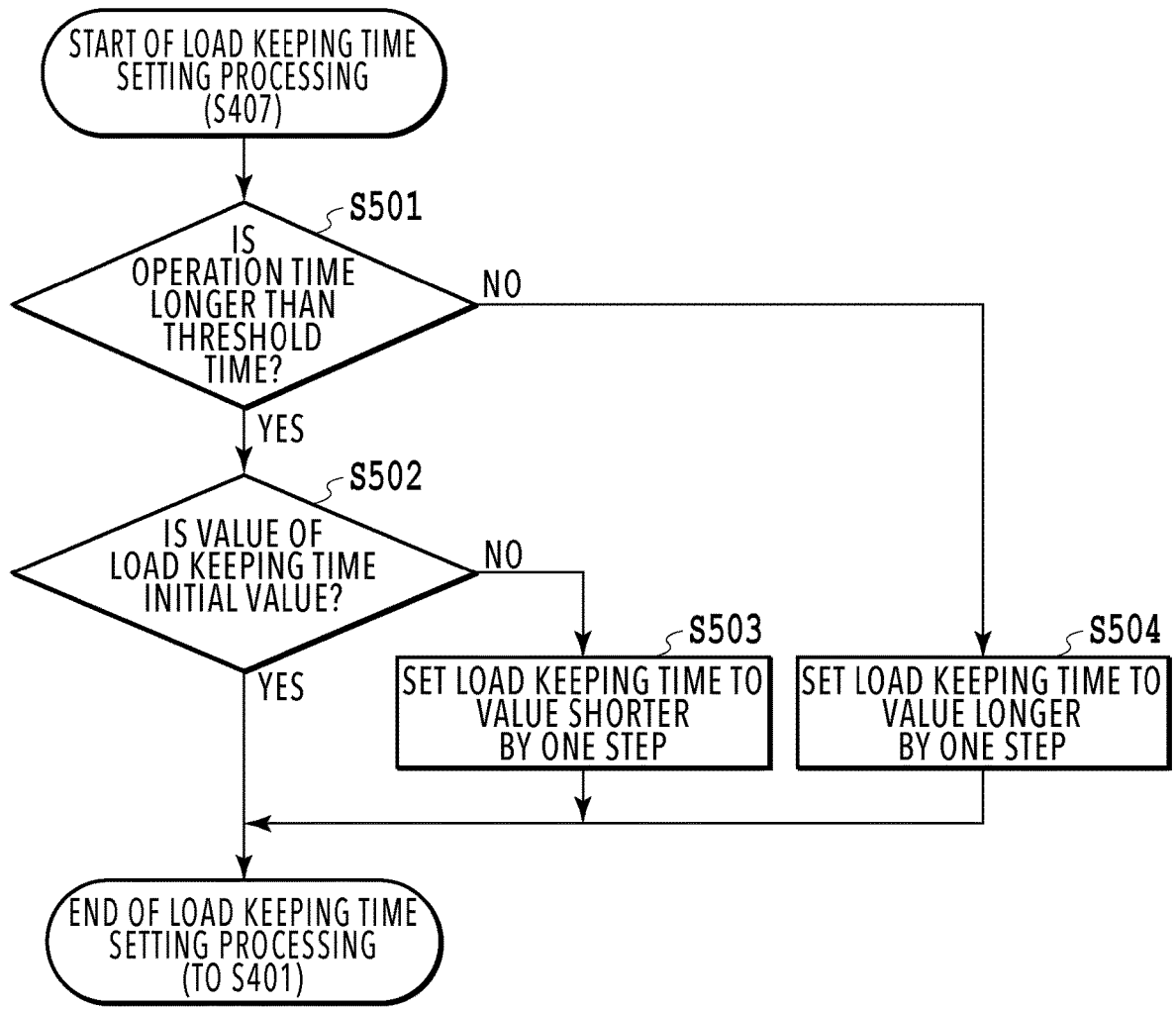
FIG. 5 is a flowchart of load keeping time setting processing in the first embodiment.

In the first embodiment, based on whether the operation time of the image forming apparatus is longer than the threshold time, the load keeping time is set (S501, S503, S504 in FIG. 5). In contrast to this, in the present embodiment, based on whether the number of times of load/unload in the HDD is smaller than a predetermined threshold value, the load keeping time is set. In the following, points different from the already-described embodiment are explained mainly and explanation of the same contents as those of the already-described embodiment is omitted appropriately.
<About Load/Unload Control Processing>

Figure 6:
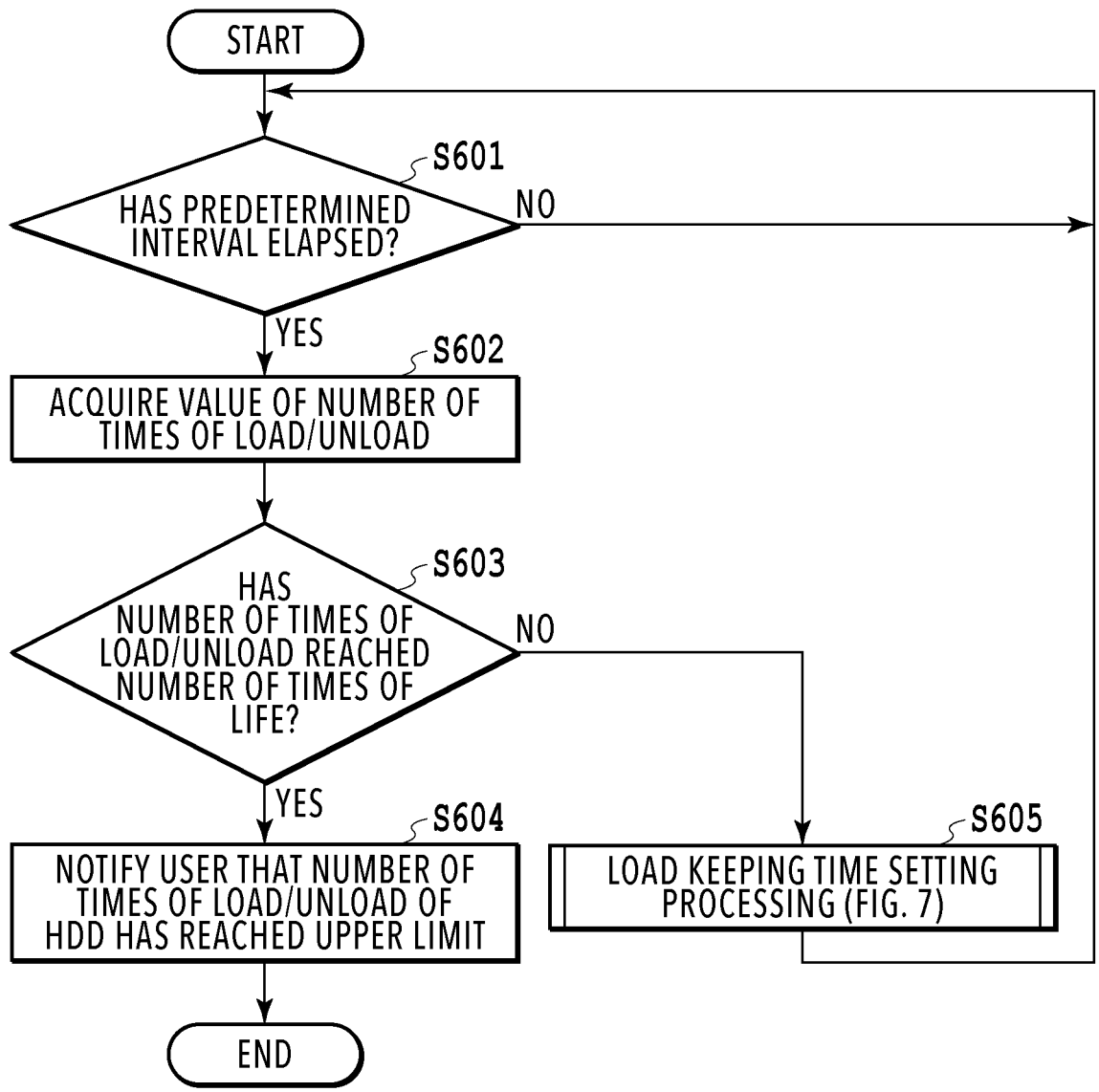
FIG. 6 is a flowchart of load/unload control processing in a second embodiment.

In the following, the load/unload control processing in the present embodiment is explained by using FIG. 6.

At S601, the CPU 101 determines whether a predetermined interval for determining timing to perform change determination of the load keeping time has elapsed. Specifically, whether the operation time of the image forming apparatus, which is derived based on the current time that can be acquired by using the RTC 115, has become a natural number multiple of a predetermined interval (referred to as B). In a case where the determination results at this step are affirmative, the processing advances to S602. On the other hand, in a case where the determination results are negative, the CPU 101 waits until a predetermined interval elapses.

At S602, the CPU 101 acquires the value of the number of times of load/unload held within the S. M. A. R. T. information stored in the NVRAM 1133. The value of the number of times of load/unload that is acquired at this step is the value at the point in time at which the change determination of the load keeping time is performed at the immediately previous S601.

At S603, the CPU 101 determines whether the value of the number of times of load/unload acquired at S602 is equal to the number of times of life of the HDD 113. In a case where the determination results at S603 are affirmative, the processing advances to S604. On the other hand, in a case where the determination results are negative, the processing advances to S605.

At S604, the CPU 101 notifies a user that the life of the HDD 113 has ended, specifically, that the number of times of load/unload in the HDD 113 has reached the upper limit via the operation unit and prompts a user to exchange the HDD.

At S605, the CPU 101 performs processing to set the load keeping time (load keeping time setting processing) and after this, the processing returns to S601. The value of the load keeping time derived by the load keeping time setting processing is stored in the NVRAM 114. Details of the load keeping time setting processing in the present embodiment will be described later by using FIG. 7.

As described above, in the present embodiment, each time the predetermined interval (B in the example described previously) elapses, whether to perform the load keeping time setting processing is determined based on the number of times of load/unload (YES at S601→S602→S603). The above is the contents of the load/unload control processing in the present embodiment.
<About Load Keeping Time Setting Processing>

Figure 7:
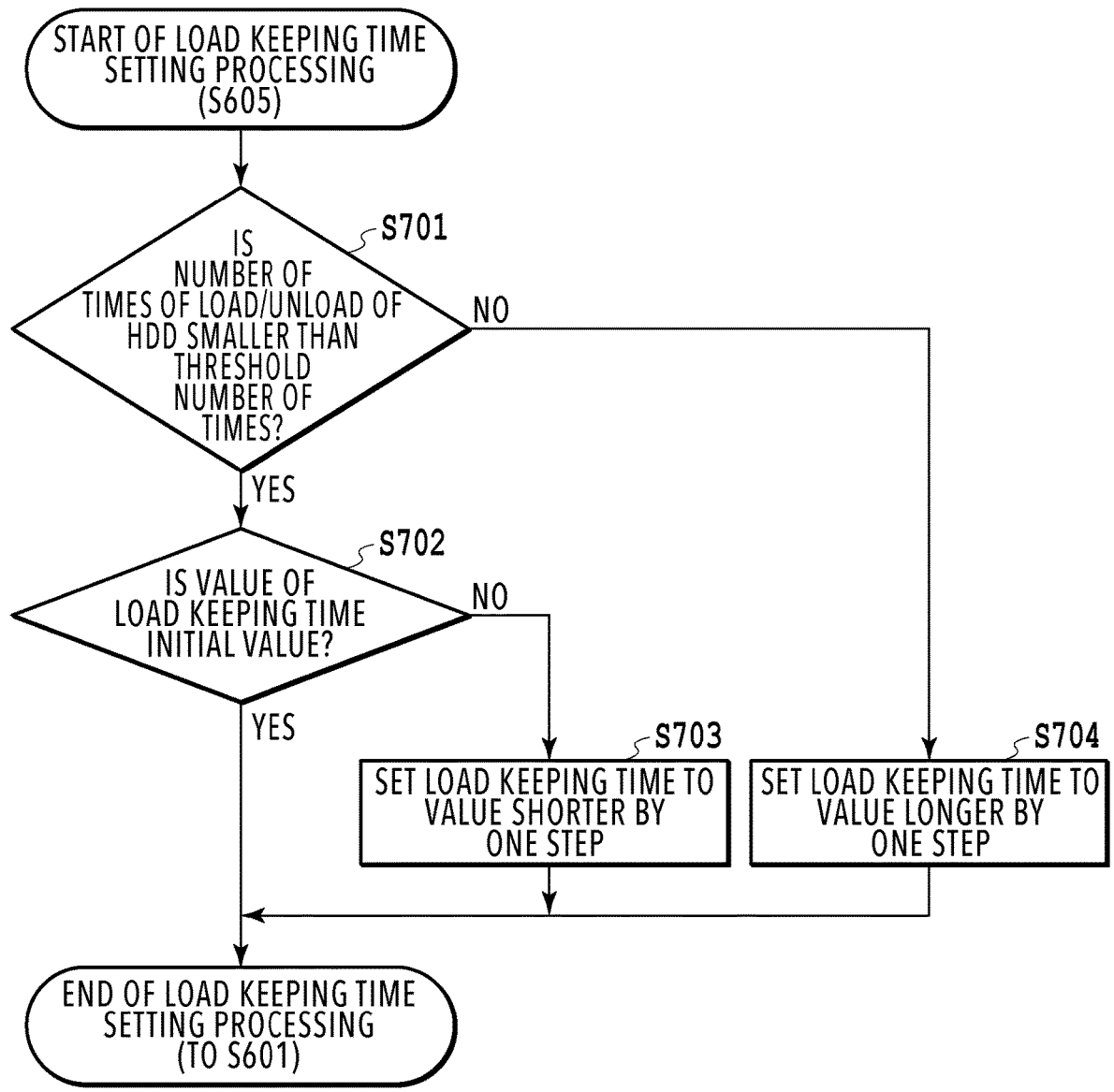
FIG. 7 is a flowchart of load keeping time setting processing in the second embodiment.

In the following, the load keeping time setting processing (S605 in FIG. 6) in the present embodiment is explained by using FIG. 7.

At S701, the CPU 101 determines whether the number of times of load/unload in the HDD 113 is smaller than the number of times set as a threshold value (referred to as threshold number of times). The threshold number of times corresponds to the operation time (natural number multiple of the predetermined interval B) and it is possible to derive the threshold number of times by using the graph illustrated in FIG. 3, or the like. In a case where the determination results at this step are affirmative, the processing advances to S702. On the other hand, in a case where the determination results are negative, the processing advances to step S704.

First, a case where the number of times of load/unload in the HDD 113 is smaller than the threshold number of times (in a case of YES at S701) is explained. In this case, at S702, the CPU 101 determines whether the value of the load keeping time stored in the NVRAM 114 is the initial value. The initial value of the load keeping time is held within the time table stored in the ROM 102. In a case where the determination results at this step are affirmative, the series of processing is terminated. In this case, the value of the load keeping time is not updated and the current value is kept. On the other hand, in a case where the determination results at this step are negative, the processing advances to S703.

At S703, the CPU 101 refers to the table holding the values of the load keeping time, which is stored in the ROM 102, and selects a value shorter than the current value by one step and stores the selected value in the NVRAM 114 (saves the selected value in an overwriting manner).

Following the above, a case where the number of times of load/unload in the HDD 113 is larger than or equal to the threshold number of times (in a case of NO at S701) is explained. In this case, at S704, the CPU 101 refers to the table holding the values of the load keeping time, which is stored in the ROM 102, and selects a value longer than the current value by one step and stores the selected value in the NVRAM 114 (saves the selected value in an overwriting manner). The above is the contents of the load keeping time setting processing in the present embodiment.

Other Embodiments

As explained above, in the present invention, by appropriately changing the load keeping time based on the operation time of the image forming apparatus and the number of times of load/unload, it is made possible to suppress the speed of an increase in the number of times of load/unload.

In the above-described example, the image forming apparatus is explained as an example, but it is also possible to apply the present invention to another information processing apparatus mounting an HDD.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to prolong the life of an HDD by performing load/unload control without reducing usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-059800, filed Mar. 27, 2018, which is hereby incorporated by reference wherein in its entirety.

What is claimed is:

1. An information processing apparatus comprising:
a hard disk drive;
a control unit configured to perform control so that a load state in the hard disk drive is kept for a predetermined time; and
a derivation unit configured to derive a number of times of load/unload in the hard disk drive, wherein
the information processing apparatus further comprises a change unit configured to change the predetermined time during which the load state is kept after a job accompanied by a processing to read, based on an operation time of the information processing apparatus indicating time elapsed since the information processing apparatus first operated and the number of times of load/unload.

2. The information processing apparatus according to claim 1, further comprising:
a first determination unit configured to determine whether the operation time is more than a threshold value by using a time uniquely derived based on the number of times of load/unload in a case where the number of times of load/unload becomes a natural number multiple of a predetermined number as the threshold value.

3. The information processing apparatus according to claim 1, further comprising:
a first determination unit configured to determine whether the number of times of load/unload is smaller than a threshold value by using a number of times uniquely derived based on a predetermined interval as the threshold value in a case where the number of times of load/unload has not reached an upper limit at the time of elapse of the predetermined interval.

4. The information processing apparatus according to claim 2, further comprising:
a second determination unit configured to determine whether the predetermined time during which the load state is kept is an initial value in a case where determination results by the first determination unit are affirmative.

5. The information processing apparatus according to claim 4, wherein
in a case where determination results by the first determination unit are negative, the change unit changes the predetermined time to a value one step longer and
in a case where determination results by the second determination unit are negative, the change unit changes the predetermined time to a value one step shorter.

6. The information processing apparatus according to claim 1, further comprising:
an acquisition unit configured to acquire a current time; and
a derivation unit configured to derive the operation time based on a time at which the information processing apparatus operates for the first time and the current time.

7. The information processing apparatus according to claim 1, further comprising:
a life determination unit configured to determine whether the number of times of load/unload has reached an upper limit indicating a life of the hard disk drive; and
a notification unit configured to notify a user that a life of the hard disk drive has ended in a case where determination results by the life determination unit are affirmative.

8. A control method of an information processing apparatus comprising a hard disk driver, a control unit configured to perform control so that a load state in the hard disk drive is kept for a predetermined time, and a derivation unit configured to derive a number of times of load/unload in the hard disk driver, the control method comprising:
a step of changing the predetermined time during which the load state is kept after a job accompanied by a processing to read, based on an operation time of the information processing apparatus indicating time elapsed since the information processing apparatus first operated and the number of times of load/unload.

9. A non-transitory computer readable storage medium storing a program for causing a computer to perform a control method of an information processing apparatus comprising a hard disk driver, a control unit configured to perform control so that a load state in the hard disk drive is kept for a predetermined time, and a derivation unit configured to derive a number of times of load/unload in the hard disk driver, the control method comprising:
a step of changing the predetermined time during which the load state is kept after a job accompanied by a processing to read, based on an operation time of the information processing apparatus indicating time elapsed since the information processing apparatus first operated and the number of times of load/unload.

* * * * *